United States Patent [19]

Etherington et al.

[11] Patent Number: 5,393,937
[45] Date of Patent: Feb. 28, 1995

[54] VEHICLE CONTROL SYSTEM

[75] Inventors: Michael Etherington, Abingdon; Michael R. Walker, Bristol, both of Va.

[73] Assignee: Dosco Overseas Engineering Ltd., England

[21] Appl. No.: 101,425

[22] Filed: Aug. 2, 1993

[51] Int. Cl.6 .............................................. G01G 19/10
[52] U.S. Cl. ..................................... 177/141; 177/145
[58] Field of Search ................. 177/136, 141, 145, 146

[56] References Cited

U.S. PATENT DOCUMENTS

| 2,879,884 | 3/1959 | Joy . | |
|---|---|---|---|
| 3,135,374 | 6/1964 | Anderson . | |
| 4,256,213 | 3/1981 | Shaw et al. . | |
| 4,465,155 | 8/1984 | Collins | 180/169 |
| 5,323,666 | 6/1994 | Etherington et al. | 180/248 X |

Primary Examiner—George H. Miller, Jr.
Attorney, Agent, or Firm—Webb Ziesenheim Bruening Logsdon Orkin & Hanson

[57] ABSTRACT

A control system for a bi-directional shuttlecar having a loading end and a discharge end. A conveyor extends along the shuttlecar from the loading end to the discharge end, and a pressure sensing transducer is located at the loading end and an independent pressure sensing transducer is located at the discharge end. The pressure sensing transducers are connected in an electric circuit with programmable logic controller which also includes a drive motor for the conveyor and a controller for the drive motor. The weight of mined material supported on the conveyor at the loading end of the vehicle is sensed by the pressure sensing transducer at the loading end and creates a signal for transmission to the programmable logic controller to start the movement of the conveyor and the weight of the mined material at the discharge end of the vehicle is sensed by the pressure transducer at the discharge end and creates a signal for transmission to the programmable logic controller to stop the movement of the conveyor.

22 Claims, 2 Drawing Sheets

VEHICLE CONTROL SYSTEM

BACKGROUND OF THE INVENTION

Field of the Invention

The invention relates generally to a system for controlling the operation of a bi-directional vehicle such as a shuttlecar for transporting mined material having a continuous conveyor extending from the loading end of the shuttlecar to the discharge end of the shuttlecar. When the shuttlecar conveyor is fully loaded with mined material, the shuttlecar moves away from the mine face to transport the mined material located thereon to another location removed from the mine face. The control system coordinates the movement of the shuttlecar conveyor along the length of the shuttlecar with the travel of the shuttlecar. The control system minimizes the length of time the shuttlecar is stationary.

SUMMARY OF THE INVENTION

The invention is a control system for controlling the movement of a conveyor located on a bi-directional vehicle such as a shuttlecar which transports mined material from a mine face to another location and for controlling the movement of the vehicle. The control system automatically coordinates the movement of the shuttlecar conveyor along the length of the shuttlecar in accordance with the amount and location of the mined material which is supported on the upper surface of the upper flight of the shuttlecar conveyor. The weight of the mined material on the loading and discharge ends of the shuttlecar conveyor is continuously sensed by a pressure transducer located in the hydraulic suspension system for the wheels at the loading end of the shuttlecar and by a pressure transducer located in the hydraulic suspension system for the wheels on the discharge section of the shuttlecar so that the mined material is relatively evenly distributed along the complete length of the conveyor and to avoid overloading of the shuttlecar. The control system permits the shuttlecar conveyor to support mined material over the entire length of the conveyor until the conveyor is filled.

As mined material is loaded onto the conveyor at the loading end of the shuttlecar, the weight of the mined material is continuously sensed by the pressure transducer in the hydraulic suspension system for the wheels on the loading end and a signal is transmitted to a programmable logic controller (P.L.C.) for transmission to the controller for the conveyor drive motor. When the force on the conveyor sensed by the pressure transducer reaches a preset level, operation of the conveyor drive motor is initiated to move the conveyor toward the discharge end of the shuttlecar. The conveyor drive motor is preset to move the conveyor along the shuttlecar at a predetermined linear rate of speed. As the conveyor transports mined material along the length of the shuttlecar away from the loading end, the force sensed by the pressure transducer in the hydraulic wheel suspension system at the loading end remains relatively constant and the pressure transducer transmits a relatively continuous signal to the P.L.C. to maintain a constant rate of speed of the conveyor. As the conveyor loaded with mined material moves along the length of the shuttlecar and approaches the discharge end, the weight on the conveyor at the discharge end gradually increases and the pressure transducer in the hydraulic wheel suspension system at the discharge end senses larger forces resulting from the increase in weight. When the force reaches a preset level, the pressure transducer transmits a signal to the P.L.C. to indicate that the conveyor is fully loaded and the P.L.C. transmits a signal to the controller for the conveyor drive motor to stop the conveyor drive motor and the movement of the conveyor. The P.L.C. simultaneously transmits a signal to flash the headlights and sound the horn at the loading end of the shuttlecar to audibly and visually notify the operator of the continuous mining machine to stop loading mined material onto the shuttlecar conveyor. Thus, the shuttlecar control system depends upon the pressure of the hydraulic fluid in the wheel suspension systems on the loading end and the discharge end of the shuttlecar which is determined by the weight of the mined material resting on the ends of the conveyor.

After loading of the conveyor begins, the partially loaded conveyor moves along the length of the shuttlecar toward the discharge end and the pressure transducer at the loading end continues to sense the force on the hydraulic wheel suspension system and transmits a signal to the P.L.C. If the force sensed by the pressure transducer at the loading end decreases below a predetermined amount, the controller for the conveyor drive motor shuts off the conveyor drive motor until the desired load on the conveyor at the loading end is reestablished or slows down the conveyor drive motor to decrease the rate of speed of the conveyor until the preset force is sensed. Thus, mined material is moved along the length of the shuttlecar on the shuttlecar conveyor, either continuously or intermittently in a series of stops and starts of the shuttlecar conveyor. The movement of the shuttlecar conveyor depends upon the rate and continuity of the loading of the mined material onto the shuttlecar conveyor at the loading end by a continuous mining machine.

When mined material is being discharged from the shuttlecar conveyor, the pressure transducer in the hydraulic wheel suspension system at the discharge end monitors the weight of the load at the discharge end of the shuttlecar. When the force sensed by the pressure transducer in the hydraulic wheel suspension system at the discharge end decreases to a preset nonloaded amount, a signal is sent to the P.L.C. and the conveyor operates for a short period of up to approximately 1 minute to be sure that it is completely empty. At the end of the short period, the P.L.C. transmits a signal to the controller for the conveyor drive motor to stop the operation of the conveyor drive motor. A signal is also transmitted by the P.L.C. to the controller for the shuttlecar traction motor to initiate movement of the shuttlecar back to the mine face.

Each wheel suspension system on the shuttlecar includes a linear transducer in the full bore end of each hydraulic cylinder. The weight of the load on the shuttlecar conveyor is converted to pressure in each hydraulic cylinder so that an increase in the magnitude of the load on the shuttlecar conveyor increases the induced hydraulic pressure within the hydraulic cylinders in the wheel suspension systems. As the pressure in each wheel suspension hydraulic cylinder increases, oil is forced from the cylinder into a pressure accumulator connected in the hydraulic system with the cylinder. Since fluid is forced out of the hydraulic cylinder, the chassis of the shuttlecar is lowered which in turn changes the position of the piston in the hydraulic cylinder in the suspension system. Thus, the position of the piston within the hydraulic cylinder and, therefore, the shuttlecar height is continuously monitored by the linear transducer in each suspension system hydraulic cylinder and signals are continually transmitted from the linear transducers to the P.L.C. When a predetermined position is reached within a hydraulic cylinder in a suspension system on the shuttlecar, the P.L.C. transmits a signal to a directional control valve to supply additional hydraulic fluid under pressure to the hydraulic cylinder or cylinders as required to maintain the preset ride height for each wheel. The wheel suspension system is the subject of copending application Ser. No. 08/054,630, filed Apr. 29, 1993.

A complete understanding of the invention will be obtained from the following description when taken in connection with the accompanying drawings wherein like reference characters identify like parts throughout.

DESCRIPTION OF THE PREFERRED EMBODIMENTS

Figure 2:
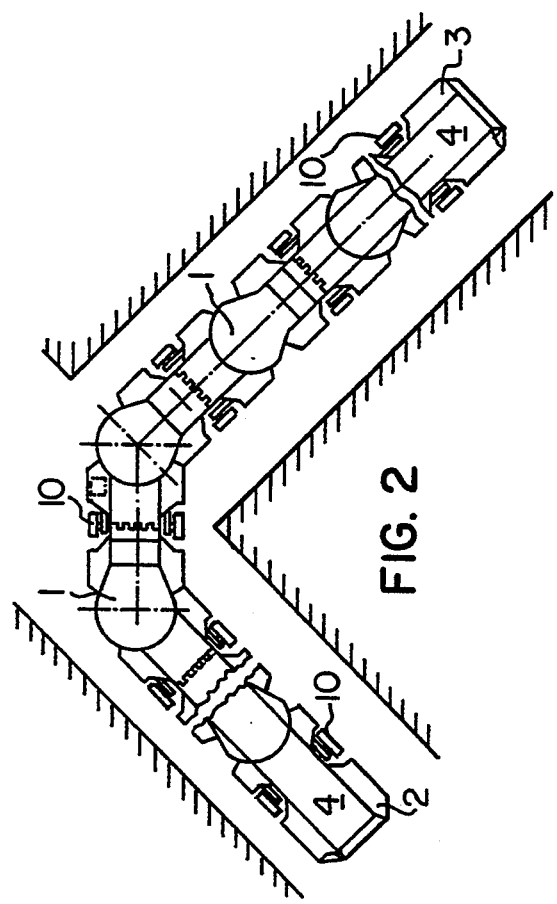
FIG. 2 is a broken plan view of a multi-section bi-directional articulated shuttlecar according to the invention.
Figure 1:
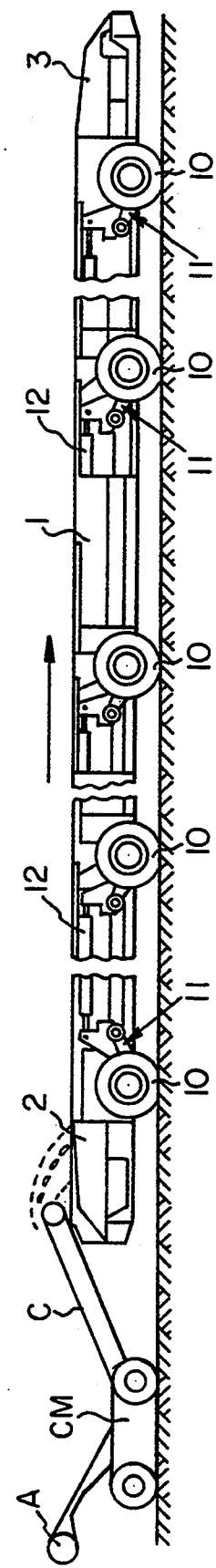
FIG. 1 is a broken elevation of a multi-section bi-directional shuttlecar according to the invention in cooperation with a continuous mining machine.
Figure 4:
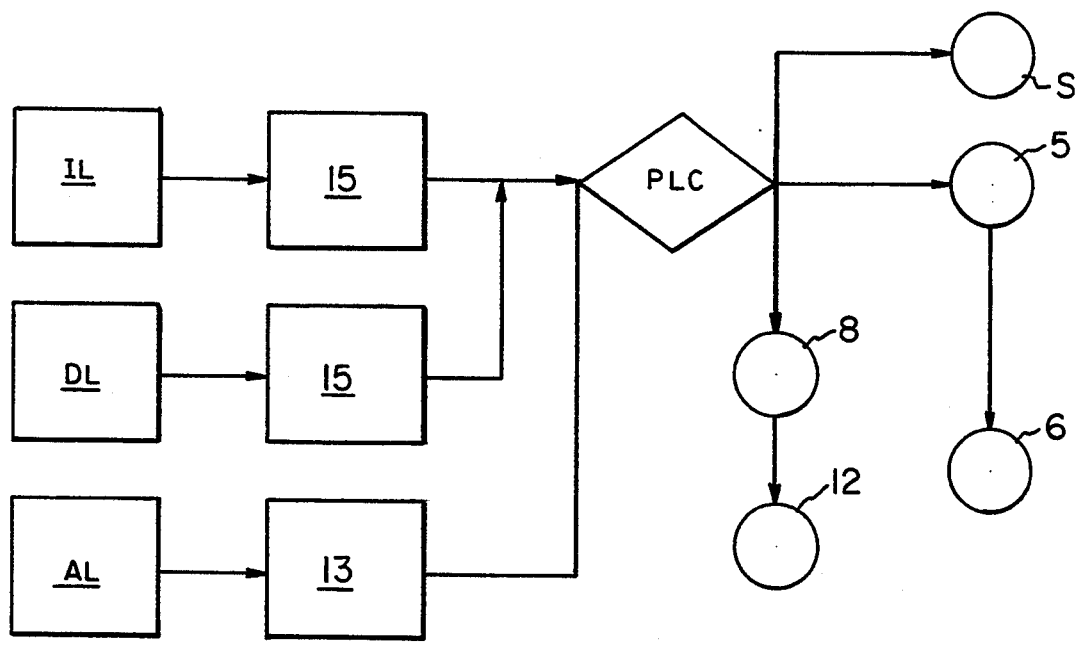
FIG. 4 is a block diagram of the automatic load control system at the loading end of the bi-directional shuttlecar.
Figure 5:
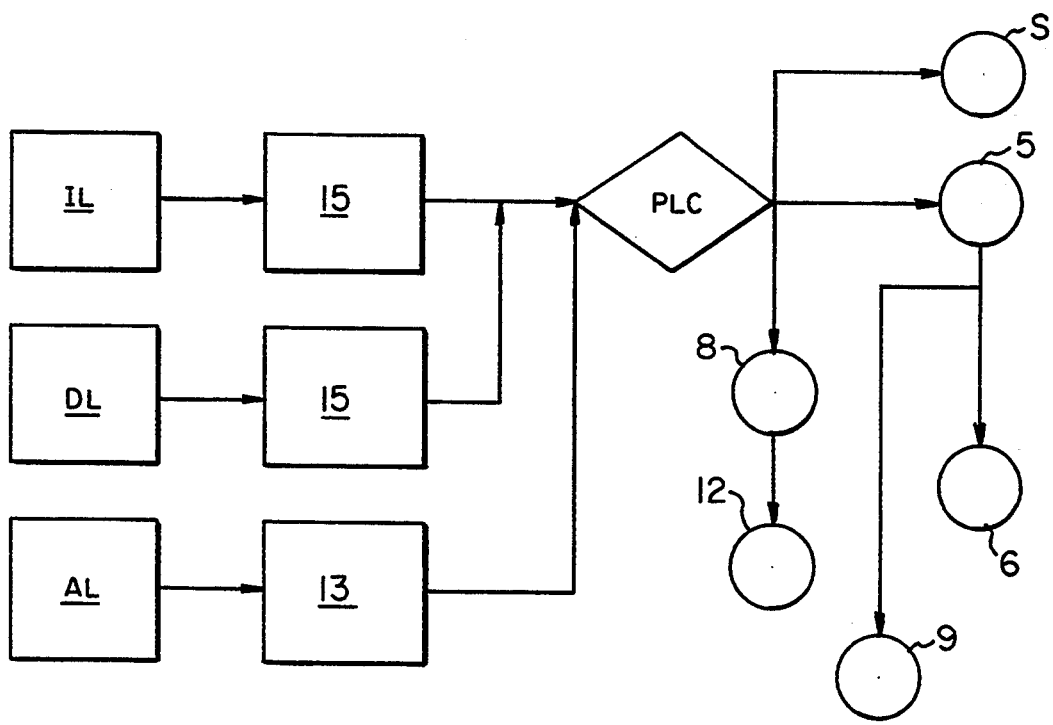
FIG. 5 is a block diagram of the automatic unload control system for the hi-directional shuttlecar.

As shown in FIGS. 1 and 2 of the drawings, the bi-directional articulated shuttlecar of the invention has a plurality of pivotally connected intermediate sections 1 each of which has a hydraulic wheel suspension system with wheels 10. A loading section 2 is located at one end of the bi-directional shuttlecar to receive mined material from a continuous miner CM. The continuous miner is a track mounted mining machine with a rotary cutting auger A mounted at the forward end. A conveyor C carries mined material from cutting auger A and deposits it onto the loading end of an elongated conveyor 4 on loading section 2 of the shuttlecar. Continuous mining machines are well-known to those skilled in the art and form no part of the instant invention. A discharge section 3 is located at the end of the bi-directional shuttlecar opposite loading section 2. Loading section 2 and discharge section 3 of the shuttlecar have spaced wheels 10 which are supported on the sections by individual mounting arrangements 11 as disclosed in more detail in U.S. patent application Ser. No. 08/054,630. The hydraulic wheel suspension systems on loading section 2 and on discharge section 3 include a hydraulic cylinder 12 for each wheel having a linear transducer 13 located therein. The linear transducer 13 in each hydraulic cylinder 12 transmits a signal to the P.L.C. which is determined by the average load AL on wheels 10 and which transmits a signal to hydraulic oil pump 8 to supply hydraulic fluid to hydraulic cylinders 12 in the wheel suspension systems to maintain wheels 10 in the preset chassis ride position. The hydraulic suspension systems on the intermediate sections are also provided with linear transducers to maintain the wheels in the preset chassis ride position.

Figure 3:
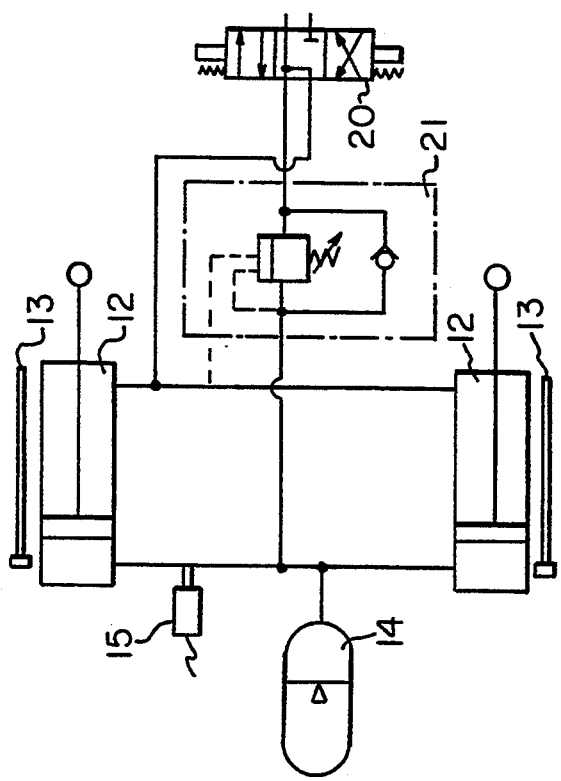
FIG. 3 is a schematic of a control system for use with the hydraulic wheel suspension systems on the loading end and the discharge end of the bi-directional shuttlecar.

The hydraulic circuit for each hydraulic wheel suspension system includes a spring loaded spool valve 20 which functions as a directional control valve for hydraulic fluid under pressure and a counterbalance valve 21. These valves are connected in a hydraulic circuit including a hydraulic fluid pump 8 and hydraulic cylinders 12 which are a part of mounting arrangements 11 for wheels 10. The hydraulic circuit shown in FIG. 3 of the drawings also includes a diaphragm type pressure accumulator 14 for the hydraulic fluid and a pressure transducer 15 which controls the operation of a controller 5 for shuttlecar conveyor drive motor 6 to move shuttlecar conveyor 4 along the length of the shuttlecar between loading section 2 and discharge section 3.

Thus, the pressure IL of the hydraulic fluid in the wheel suspension system at loading section 2 increases in accordance with the magnitude of the load on conveyor 6 at the loading section which is transmitted to wheels 10. When the pressure IL sensed by pressure transducer 15 in the hydraulic wheel suspension system reaches a preset value, pressure transducer 15 transmits a signal to controller 5 to start the operation of conveyor drive motor 6 to move conveyor 4 along the bi-directional shuttlecar from loading section 2 toward discharge section 3 in the direction of the arrow shown in FIG. 1 of the drawings. Conveyor drive motor 6 continues to operate to move conveyor 4 until a second preset lower pressure IL is sensed by pressure transducer 15 in the hydraulic wheel suspension system at loading section 2 at which point controller 5 switches off the conveyor drive motor. After conveyor drive motor 6 is switched off, the sequence of operation is repeated until conveyor 4 is fully loaded with mined material throughout the length of the shuttlecar. Alternatively, if mined material is supplied to shuttlecar conveyor 4 at a relatively constant rate, conveyor drive motor 6 operates continuously until the shuttlecar conveyor is full throughout its length.

Pressure transducer 15 in the hydraulic wheel suspension system at discharge section 3 of the bi-directional shuttlecar senses a continuing increase in the pressure DL of the hydraulic fluid in the wheel suspension system at the discharge section as the loaded conveyor moves along the shuttlecar toward the discharge section. When shuttlecar conveyor 4 is fully loaded with mined material, pressure DL will reach a preset level and pressure transducer 15 transmits a signal to the P.L.C. to signal controller 5 to stop conveyor drive motor 6 and initiate visual and audible signals to alert the operator of the continuous mining machine that the shuttlecar conveyor is fully loaded. The fully loaded shuttlecar moves away from the loading station at the mine face to transport the mined material to a discharge station remote from the mine face.

It is readily apparent from the above description that shuttlecar conveyor 4 receives mined material throughout its length without danger of overloading. The operator of the shuttlecar initiates the movement of the conveyor by means of an on/off toggle switch on the control panel at the operator station. In order to start the movement of the shuttlecar conveyor, the switch is lifted by the operator which prevents accidentally moving the shuttlecar conveyor in the wrong direction. The pressure transducers in the hydraulic wheel suspension Systems for wheels 10 on loading section 2 and on discharge section 3 sense the weight of the mined material, IL and DL, on shuttlecar conveyor 4 as the conveyor moves along the length of the shuttlecar. The signal generated in response to the weight of the mined material automatically operates controller 5 for conveyor drive motor 6. In this regard, when the conveyor mode switch is in the auto load position and the conveyor direction switch is in the out position, conveyor 4 automatically moves along the length of the shuttlecar toward discharge section 3 until the upper surface of the entire conveyor is loaded with mined material. As mined material is loaded onto the shuttlecar conveyor, the load IL sensed by pressure transducer 15 in the hydraulic wheel mounting system for loading section 2 increases and a signal is transmitted to the P.L.C. and to controller 5 to start conveyor drive motor 6 when the force sensed by pressure transducer 15 reaches a predetermined level. The conveyor drive motor is set to operate at a predetermined speed which is controlled by the P.L.C. As conveyor 4 moves along the length of the shuttlecar toward discharge section 3, the mined material is moved away from loading section 2 and the load DL sensed by the pressure transducer at the loading section decreases. When the pressure drops below a predetermined level, the pressure transducer transmits a signal to the P.L.C. and to controller 5 to stop the conveyor drive motor. This ensures that mined material is loaded along the complete length of shuttlecar conveyor 4 before the shuttlecar leaves the mine face.

As the mined material is transported along the length of the bi-directional shuttlecar on conveyor 4, the magnitude of the load at the discharge section increases and the force sensed by pressure transducer 15 gradually increases to a preset level which indicates that the conveyor is full. At this time, the pressure transducer sends a signal to the P.L.C. and to controller 5 to stop the operation of conveyor drive motor 6. Simultaneously, a signal is provided to audible and visual control S to flash the forward loading section headlights and sound a horn to signal the operator of the continuous mining machine that the shuttlecar conveyor is full and will leave the mine face to transport its load to another location.

When the bi-directional shuttlecar reaches its destination, conveyor drive motor 6 moves conveyor 4 to discharge the mined material. At the completion of the discharge cycle, pressure transducer 15 at discharge section 3 senses a decrease in load DL to a predetermined amount and transmits a signal to the P.L.C. and to controller 5. Controller 5 then transmits a signal to initiate the operation of traction motor 9 to return the bi-directional shuttlecar to the mine face.

Simultaneously with the loading, transportation and unloading of the mined material on the shuttlecar conveyor, the height of the vehicle is being continuously measured by the linear transducer 13 in each hydraulic cylinder 12 to maintain the shuttlecar chassis at a preset ride height above the mine floor.

In an alternate arrangement, the fully loaded shuttlecar is driven into an elongated unloading hopper such as disclosed in detail in U.S. patent application Ser. No 08/103,356, filed Aug. 9, 1993. When the fully loaded shuttlecar is located within the hopper, conveyor drive motor 6 is started to move conveyor 4 toward discharge section 3 of the shuttlecar to discharge mined material from the upper surface of the conveyor onto a conveyor located in the bottom of the hopper. Shuttlecar traction motor 9 is started at the same time as shuttlecar conveyor motor 6 to move the shuttlecar in the direction out of the elongated hopper. Thus, the P.L.C. located in the shuttlecar electric circuit activates controller 5 for conveyor drive motor 6 simultaneously with the shuttlecar traction motor 9, and the linear speeds of conveyor 4 and the shuttlecar are set to be substantially the same but the directions of movement of conveyor 4 and of the shuttlecar are opposite. As the shuttlecar moves out of the elongated hopper, mined material is continuously laid on the upper surface of the hopper conveyor by shuttlecar conveyor 4. Because the rates of movement of the shuttlecar and shuttlecar conveyor 4 are substantially identical, the discharge of material from the shuttlecar conveyor 4 will be completed when the shuttlecar exits the hopper.

After all of the material has been discharged from shuttlecar conveyor 4, the pressure transducer located in the hydraulic suspension system for the wheels at the discharge section of the shuttlecar sends a signal to the P.L.C. to stop conveyor drive motor 6 and simultaneously increase the speed of shuttlecar traction motor 9 to return the shuttlecar to the mine face at a greater speed than the speed along the elongated hopper during unloading of the mined material from the shuttlecar conveyor. It will be seen that during unloading mined material from the shuttlecar, the speed of shuttlecar traction motor 9 is limited to the speed of shuttlecar conveyor drive motor 6 so that mined material is continuously unloaded from shuttlecar conveyor 4 as the shuttlecar moves along the elongated hopper and unloading is completed when the shuttlecar reaches the entry end of the elongated hopper. This arrangement permits the continuous unloading of the shuttlecar conveyor rather than unloading it while it is stationary and thereby decreases the length of the shuttlecar operating cycle.

The control system of the invention has been described in connection with a multi-section articulated shuttlecar. However, it will be understood by those skilled in the art that the control system can be used to control the operation of any elongated vehicle having a conveyor extending from a loading end to a discharge end and having a system at each end to constantly measure the weight of mined material on the conveyor at the end.

While specific embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

We claim:

1. A control system for controlling the operation of a bi-directional shuttlecar having a plurality of connected sections including at least a loading section having wheels and a discharge section having wheels, a conveyor extending from said loading section of said shuttlecar to said discharge section of said shuttlecar, an electric control circuit including pressure sensing means located at said loading section of said shuttlecar and independent pressure sensing means located at said discharge section of said shuttlecar, a conveyor drive motor to move said conveyor along said shuttlecar between said loading section and said discharge section, a programmable logic controller connected in said electric control circuit with said conveyor drive motor, said pressure sensing means located at said loading section of said shuttlecar and said pressure sensing means located at said discharge section of said shuttlecar and a motor controller connected in said electric control circuit, whereby mined material is loaded onto said conveyor at said loading section of said shuttlecar to increase the force sensed by said pressure sensing means located at said loading section until the force exceeds a preset amount to create a signal for transmission to said programmable logic controller in said electric control circuit to activate said motor controller for said conveyor drive motor to initiate movement of said conveyor from said loading section of said shuttlecar toward said discharge section of said shuttlecar and said pressure sensing means located at said discharge section of said shuttlecar continuously senses the force at said discharge section of said shuttlecar until the force at said discharge section exceeds a predetermined amount wherein said pressure sensing means located at said discharge section creates a signal for transmission to said programmable logic controller and to said motor controller for said conveyor drive motor to stop the operation of said conveyor drive motor and stop the movement of said conveyor.

2. A control system as set forth in claim 1 wherein said pressure sensing means located at said loading section and said pressure sensing means located at said discharge section are transducers.

3. A control system as set forth in claim 2 wherein said shuttlecar includes at least one intermediate section connected between said loading section and said discharge section.

4. A control system as set forth in claim 1 wherein each of said loading section and said discharge section includes a hydraulic suspension means for said wheels and said pressure sensing means located at each of said sections is operatively connected with said hydraulic suspension means to sense the force on said wheels at each of said loading section and said discharge section.

5. A control system as set forth in claim 3 wherein said pressure sensing means located at said loading section and said pressure sensing means located at said discharge section are transducers.

6. A control system as set forth in claim 3 wherein each of said hydraulic suspension means includes a hydraulic cylinder connected to a wheel to vary the vertical position of the wheel and a linear transducer operatively connected in each of said hydraulic cylinders to monitor the ride position of the connected wheel during operation of said shuttlecar.

7. A control system as set forth in claim 3 wherein said shuttlecar includes at least one intermediate section connected between said loading section and said discharge section.

8. A control system as set forth in claim 7 wherein each of said hydraulic suspension means includes a hydraulic cylinder connected to a wheel to vary the vertical position of the wheel and a linear transducer operatively connected in each of said hydraulic cylinders to monitor the ride position of the connected wheel during operation of said shuttlecar.

9. A control system as set forth in claim 1 wherein said electric control circuit includes audible indicator means at said loading section of said shuttlecar.

10. A control system as set forth in claim 1 wherein said electric control circuit includes visible indicator means at said loading section of said shuttlecar.

11. A control system as set forth in claim 1 including a traction motor for said shuttlecar connected in said electric control circuit to said motor controller, whereby said traction motor is operated by said programmable logic controller when said pressure sensing means located at said discharge section of said shuttlecar senses a predetermined force indicating that said conveyor is empty.

12. A control system as set forth in claim 1 wherein said shuttlecar includes at least one intermediate section connected between said loading section and said discharge section.

13. A method for controlling the operation of a bi-directional shuttlecar having at least a loading section, a discharge section, a conveyor extending from said loading section to said discharge section, an electric control circuit including pressure sensing means located at said loading section and pressure sensing means located at said discharge section, a conveyor drive motor for moving said conveyor along said shuttlecar between said loading section and said discharge section, a programmable logic controller connected in said electric control circuit with said pressure sensing means located at said loading section and said pressure sensing means located at said discharge section and a motor controller connected in said electric control circuit, said method comprising continuously sensing the weight of mined material as it is loaded onto said conveyor at said loading section, creating a signal when the weight of mined material on said conveyor at said loading section exceeds a preset amount, transmitting said signal to said programmable logic controller, transmitting a signal from said programmable logic controller to said motor controller for said conveyor drive motor to initiate operation of said conveyor drive motor to move said conveyor in the direction from said loading section toward said discharge section, continuously sensing the weight of mined material on said conveyor at said discharge section, creating a signal when the weight on said conveyor at said discharge section exceeds a predetermined weight, transmitting said signal to said programmable logic controller, transmitting a signal from said programmable logic controller to said motor controller for said conveyor drive motor to stop the operation of said conveyor drive motor when the weight of mined material on said conveyor at said discharge section exceeds a predetermined weight.

14. A method as set forth in claim 13 wherein said electric control circuit includes a traction motor for moving said shuttlecar connected to said motor controller, said method including transmitting a signal to said programmable logic controller when said pressure sensing means located at said discharge section senses a predetermined weight indicating that said conveyor is empty and transmitting a signal from said programmable logic controller to said traction motor to operate said traction motor to move said shuttlecar to said mine face at maximum travel speed.

15. A control system for controlling the operation of a bi-directional vehicle having wheels and having a loading end and a discharge end, a conveyor extending from said loading end of said vehicle to said discharge end of said vehicle, an electric control circuit including means located at said loading end of said vehicle for sensing the weight of mined material on said conveyor at said loading end of said vehicle and independent means located at said discharge end of said vehicle for sensing the weight of mined material on said conveyor of said discharge end of said vehicle, a conveyor drive motor to move said conveyor between said loading end of said vehicle and said discharge end of said vehicle, a programmable logic controller connected in said electric control circuit with said means for sensing weight locating at said loading end of said vehicle and said means for sensing weight located at said discharge end of said vehicle, a motor controller connected in said electric control circuit, whereby mined material is loaded onto said conveyor at said loading end of said vehicle to increase the force sensed by said means for sensing weight located at said loading end of said vehicle until the force exceeds a preset amount to create a signal for transmission to said programmable logic controller in said electric control circuit to activate said motor controller for said conveyor drive motor to initiate movement of said conveyor from said loading end of said vehicle toward said discharge end of said vehicle and said means for sensing weight located at said discharge end of said vehicle continuously senses the force at said discharge end of said vehicle until the force at said discharge end exceeds a predetermined amount wherein said means for sensing weight located at said discharge end creates a signal for transmission to said programmable logic controller and to said motor controller for said conveyor drive motor to stop the operation of said conveyor drive motor and stop the movement of said conveyor.

16. A control system as set forth in claim 15 wherein said means for sensing weight located at said loading end of said vehicle and said independent means for sensing weight located at said discharge end of said vehicle are transducers.

17. A control system as set forth in claim 15 wherein each of said loading end of said vehicle and said discharge end of said vehicle includes hydraulic suspension means for said wheels and said means for sensing weight located at each of said ends of said vehicle is operatively connected into said hydraulic suspension means to sense the force on said wheels at each of said loading end of said vehicle and said discharge end of said vehicle.

18. A control system as set forth in claim 17 wherein each of said hydraulic suspension means includes a hydraulic cylinder connected to a wheel at said loading end of said vehicle and said discharge end of said vehicle to adjust the vertical position of the wheel and a linear transducer operatively connected in each of said hydraulic cylinders to monitor the ride position of the connected wheel during operation of said vehicle.

19. A control system as set forth in claim 15 including a traction motor for said vehicle connected to said motor controller, whereby said traction motor is operated by said programmable logic controller when said means for sensing weight located at said discharge end of said vehicle senses a predetermined force indicating that said conveyor is empty.

20. A method for controlling the operation of a bi-directional vehicle having a loading end, a discharge end, a conveyor extending from said loading end to said discharge end, an electric control circuit including means for sensing weight located at said loading end and independent means for sensing weight located at said discharge end, a conveyor drive motor for moving said conveyor along said vehicle from said loading end toward said discharge end, a programmable logic controller connected in said electric control circuit with said means for sensing weight located at said loading end and said means for sensing weight located at said discharge end and a motor controller connected in said electric control circuit, said method comprising continuously sensing the weight of mined material as it is loaded onto said conveyor at said loading end, creating a signal when the weight of mined material on said conveyor at said loading end exceeds a preset amount, transmitting said signal to said programmable logic controller, transmitting a signal from said programmable logic controller to said motor controller for said conveyor drive motor to initiate operation of said conveyor drive motor to move said conveyor between said loading end and said discharge end, continuously sensing the weight of mined material on said conveyor at said discharge end, creating a signal when the weight on said conveyor at said discharge end exceeds a predetermined load, transmitting said signal to said programmable logic controller and transmitting a signal from said programmable logic controller to said motor controller for said conveyor drive motor to stop operation of said conveyor drive motor to stop the movement of said conveyor.

21. A method as set forth in claim 20 wherein said electric control circuit includes a traction motor connected to said motor controller for moving said vehicle, transmitting a signal to said programmable logic controller when said means for sensing weight located at said discharge end of said vehicle senses a predetermined weight indicating that said conveyor is empty and transmitting a signal from said programmable logic controller to said traction motor to operate said traction motor to move said vehicle.

22. A method as set forth in claim 20 including coordinating the speed of movement of said conveyor with the speed of movement of said vehicle, whereby said conveyor moves from said discharge end of said vehicle toward said loading end of said vehicle at substantially the same linear speed as the linear speed of movement of said vehicle.

* * * * *

UNITED STATES PATENT AND TRADEMARK OFFICE
CERTIFICATE OF CORRECTION

PATENT NO. : 5,393,937
DATED : February 28, 1995
INVENTOR(S) : Michael Etherington and Michael R. Walker It is certified that error appears in the above-indentified patent and that said Letters Patent is hereby corrected as shown below:

Column 3 Line 34 "hi-directional" should read --bi-directional--.

Column 4 Line 67 "Systems" should read --systems--.

Claim 5 Line 41 Column 7 "3" should read --4--.

Claim 6 Line 45 Column 7 "3" should read --4--.

Claim 7 Line 52 Column 7 "3" should read --4--.

Claim 15 Line 6 Column 9 "locating" should read --located--.

Signed and Sealed this

Ninth Day of May, 1995

Attest:

*Attesting Officer*

BRUCE LEHMAN

*Commissioner of Patents and Trademarks*